(12) United States Patent
Hartford

(10) Patent No.: US 9,674,650 B2
(45) Date of Patent: Jun. 6, 2017

(54) FAMILIARITY MEASURE TO GROUP OBJECTS

(71) Applicant: HERE Global B.V., Veldhoven (NL)

(72) Inventor: Stephen Hartford, San Jose, CA (US)

(73) Assignee: HERE Global B.V., Eindhoven (NL)

( * ) Notice: Subject to any disclaimer, the term of this patent is extended or adjusted under 35 U.S.C. 154(b) by 57 days.

(21) Appl. No.: 13/952,176

(22) Filed: Jul. 26, 2013

(65) Prior Publication Data

US 2015/0031396 A1    Jan. 29, 2015

(51) Int. Cl.
*H04W 4/02* (2009.01)
*G06F 17/30* (2006.01)

(52) U.S. Cl.
CPC ........ *H04W 4/02* (2013.01); *G06F 17/30041* (2013.01); *G06F 17/30044* (2013.01)

(58) Field of Classification Search
CPC .......... G06F 17/3028; G06F 17/30241; G06F 17/30265; G06F 17/30041; G06F 17/30044; G06F 17/3025; G06F 17/30268; G06F 17/30274; G06F 17/30817; G06F 17/3087; G06K 2009/00328; G06K 9/00684; G06K 9/6218; G06K 9/628; H04N 1/32128; H04N 1/4126; H04N 1/41407; H04N 1/4345; H04N 1/4524; H04N 1/4788; H04N 2201/3205; H04N 2201/3214; H04N 2201/3215; H04N 2201/3252; H04N 2201/3253

(Continued)

(56) References Cited

U.S. PATENT DOCUMENTS 6,657,666 B1   12/2003   Imagawa et al.
6,690,883 B2    2/2004   Pelletier
(Continued)

FOREIGN PATENT DOCUMENTS

WO   WO2011051091   5/2011
WO   WO2013000153   1/2013
WO   WO2013070816   5/2013

OTHER PUBLICATIONS iMovie '08, Getting Started, 2008, Apple Inc.
(Continued)

*Primary Examiner* — George Eng
*Assistant Examiner* — Umair Ahsan
(74) *Attorney, Agent, or Firm* — Lempia Summerfield Katz LLC

(57) ABSTRACT

In one embodiment, grouping, organization, or storage locations are defined for digital objects based on a user's familiarity with the geographic location where the digital objects were generated. For example, a mobile device generates the digital objects. The digital objects are received or collected at the mobile device or at a server. A first digital object is generated at a first time stamp and assigned a geographic location to the digital object according to a current location of the mobile device. Familiarity data is accessed according to the current geographic location, and a time period is set based on the familiarity data. The digital object is associated with at least one additional digital object generated within the time period to the first time stamp of the collected digital object. For example, photographs are grouped together in a digital photo album according to familiarity and collection times.

16 Claims, 7 Drawing Sheets

(58) Field of Classification Search
USPC .................. 455/456.1, 456.3, 456.6–457
See application file for complete search history.

(56) References Cited

U.S. PATENT DOCUMENTS

| | | | |
|---|---|---|---|
| 7,978,232 B1 | 7/2011 | Khan | |
| 2004/0021780 A1 | 2/2004 | Kogan | |
| 2005/0278371 A1 | 12/2005 | Funk et al. | |
| 2007/0276845 A1 | 11/2007 | Geilich | |
| 2008/0133526 A1* | 6/2008 | Haitani | G06F 17/30265 |
| 2009/0077129 A1 | 3/2009 | Blose | |
| 2009/0143984 A1 | 6/2009 | Baudisch et al. | |
| 2011/0055224 A1 | 3/2011 | Rossio et al. | |
| 2011/0099199 A1* | 4/2011 | Stalenhoef et al. | 707/770 |
| 2011/0235858 A1* | 9/2011 | Hanson et al. | 382/103 |
| 2011/0280497 A1 | 11/2011 | Berger et al. | |
| 2012/0030575 A1 | 2/2012 | Cok | |
| 2012/0301039 A1* | 11/2012 | Maunder et al. | 382/225 |
| 2013/0129232 A1 | 5/2013 | Cok et al. | |
| 2014/0089223 A1 | 3/2014 | Klassen et al. | |
| 2014/0250126 A1* | 9/2014 | Baldwin et al. | 707/737 |

OTHER PUBLICATIONS

L. Kennedy et al., How Flickr Helps us Make Sense of the World: Context and Content in Community Contributed Media Collections, Sep. 23-28, 2007, Yahoo! Research, Berkeley, CA.

N. Savage et al., Seems Familiar: An Algorithm for Inferring Spatial Familiarity Automatically, accessed Feb. 5, 2013, Computer Science Department, University of California, Santa Barbara, CA.

International Search Report and Written Opinion cited in PCT/EP2014/053510, mailed Apr. 22, 2014.

International Search Report and Written Opinion cited in PCT/EP2014/063203, mailed Dec. 3, 2014.

* cited by examiner

110

| Familiarity Score | Event Time Period (min) |
|---|---|
| 0 | 660 |
| 10 | 600 |
| 20 | 540 |
| 30 | 480 |
| 40 | 420 |
| 50 | 360 |
| 60 | 300 |
| 70 | 240 |
| 80 | 180 |
| 90 | 120 |
| 100 | 60 |

FIG. 2

FAMILIARITY MEASURE TO GROUP OBJECTS

FIELD

The following disclosure relates to location based services and digital photography and more particularly, to a familiarity measure for grouping digital objects such as photographs.

BACKGROUND

Digital photography has become ubiquitous. Many people carry a digital camera every day in the form of a smart phone. Smart phones include data storage sufficient for thousands of photographs. However, smart phones are particularly inconvenient for cataloging and organizing photographs. One system for cataloging photographs involves geocoding and reverse geocoding.

Geocoding is the process of finding associated geographic information, such as geographic coordinates of latitude and longitude, from geographic information of a different format, such as a query including the street address. Reverse geocoding is the process of associating textual location such as a street address, from geographic coordinates. However, geocoding and reverse geocoding are typically inflexible. Challenges remain for the improvement of automatically cataloging or organizing digital objects.

SUMMARY

In one embodiment, grouping, organization, or storage locations are defined for digital objects based on a user's familiarity with the geographic location where the digital objects were generated. For example, a mobile device generates the digital objects. The digital objects are received or collected at the mobile device or at a server. A first digital object is generated at a first time stamp and assigned a geographic location to the digital object according to a current location of the mobile device. Familiarity data is accessed according to the current geographic location, and a time period is set based on the familiarity data. The digital object is associated with at least one additional digital object generated within the time period to the first time stamp of the collected digital object. For example, photographs are grouped together in a digital photo album according to familiarity and collection times.

BRIEF DESCRIPTION OF THE DRAWINGS

Exemplary embodiments of the present invention are described herein with reference to the following drawings.

FIG. 2 illustrates an example relationship between familiarity and an event definition.

DETAILED DESCRIPTION

People interact with an increasing number of digital objects via computing devices such as smartphones and tablets. The digital objects may be photographs, documents, emails, text messages, contacts or any data file type generated by a computer. Attributes of the digital object (e.g., metadata) may be used to identify and group the objects. Location based grouping uses metadata to assign names, photo albums, or storage locations to digital objects based on a geographic location of a device that generates the object. However, this metadata is used without regard to whether the data is the best approach for grouping the objects for the individual user. The following embodiments optimize the organization of digital objects using techniques specifically tailored to a user. For example, the familiarity of the user with the geographic location where the digital object was generated or collected may impact the organization of the digital objects.

Digital objects are stored or organized according to events. An event is measured in time according to event time periods. In one example, a default event time period may be 6 hours. Therefore, digital objects that are collected in succession without more than 6 hours passing between successive digital objects will be organized into a single event, which could be embodied as a photo album, a website, a directory, a folder, or another organizational technique. However, a one-size-fits-all approach to event timing is not the most effective approach. For example, on vacation, people often would consider photographs from the entire vacation to be grouped in a single photo album. But since people often stop taking photographs for more than 6 hours each day during the night, each day would automatically become a separate photo album using the default event time period.

To remedy this situation, the event time period may be related to the familiarity of the user with the location where the digital object was generated. For example, digital objects collected near home are organized using the default event time period. Digital objects farther from home are organized according to a larger default time period. The larger default time period may be an amount of time longer than people usually sleep. Examples include 12 hours and 25 hours. Using the larger default time period all of the photographs taken on a vacation are grouped in a single photo album.

The knowledge and experiences of a given user or group of users with a particular geographic area is measured based on user activity. The user activity may include places that the user has visited, taken pictures near, once lived, or read about. The user activity may include content that the user has viewed or contributed. By examining the user activity, digital objects may be organized and/or named in ways that are easily understandable.

Figure 1:
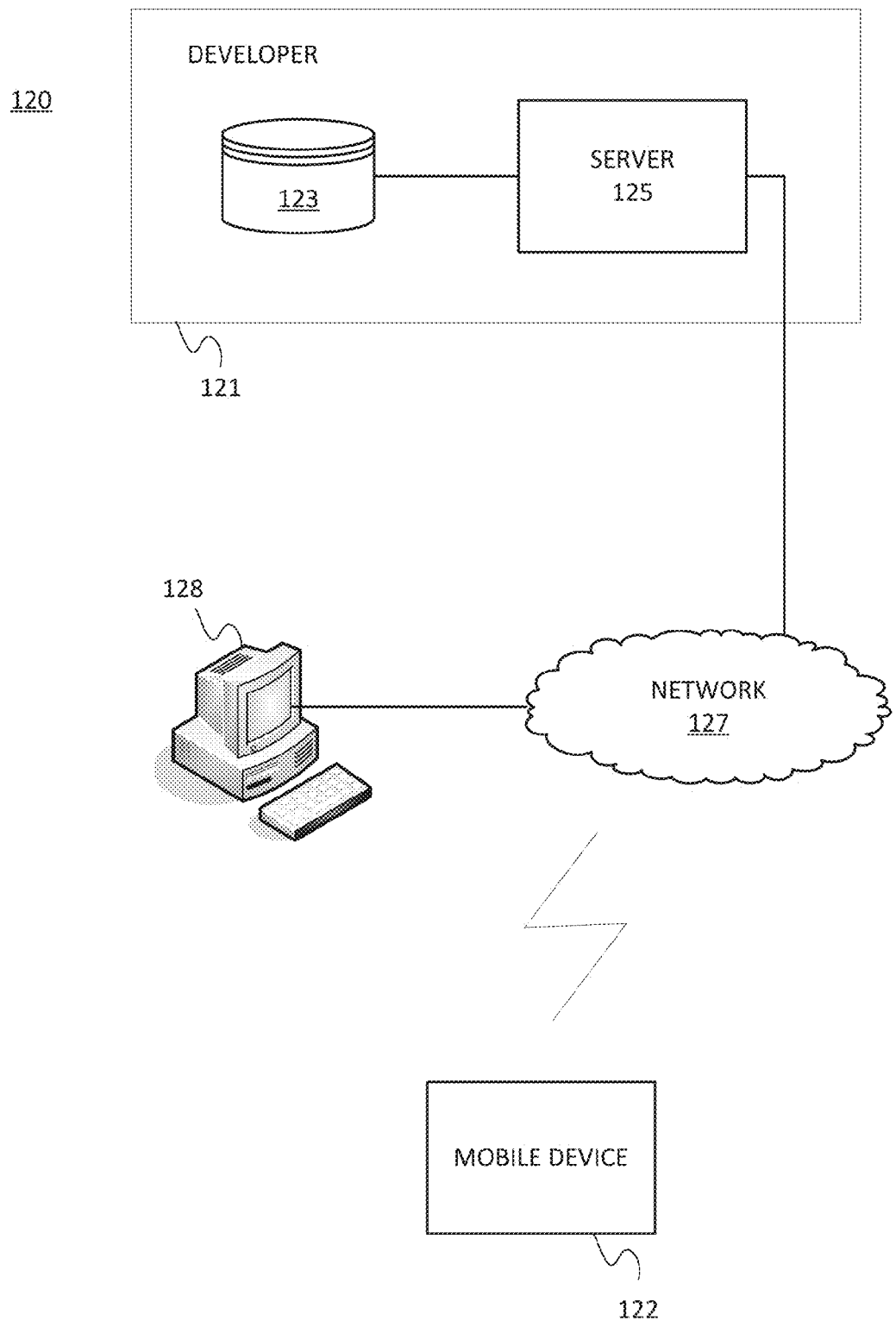
FIG. 1 illustrates an example system for grouping digital objects based on familiarity.

FIG. 1 illustrates an exemplary navigation system 120. The navigation system 120 includes a developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. The developer system 121 may include computer systems and networks of a system operator (e.g., NAVTEQ or Nokia Corp.).

The mobile device 122 is configured to collect or generate digital objects. The digital objects are stored along with a time stamp. The time stamp may be generated at the mobile device 122 upon generation of the digital object or at the server 125 when the digital object is uploaded to another network location. The digital object may be any type of file. Examples of digital objects include photographs, audio recordings, video recordings, emails, text messages, contacts, or online postings. The digital object may be generated by the mobile device 122 while at a current geographic location. The current geographic location is associated with a familiarity score indicative of how familiar a particular user is with the geographic location. The familiarity score is calculated based on familiarity data for the current geographic location. The familiarity data may be received from the mobile device 122 or otherwise collected by the server 125.

The familiarity data may describe user activity or activity of the mobile device 122. For example, the familiarity data may indicate how many photographs at (or within a specific distance to) the current geographic location the mobile device 122 has generated. The quantity of photographs or other digital objects generated near the geographic location may be directly proportional to the familiarity score. The distance of each of the other digital objects from the geographic location may define a weight for calculating the familiarity score (i.e., closer digital object more strongly influence the familiarity score than farther digital objects). In addition or in the alternative, the familiarity data may depend on a frequency or duration that the mobile device 122 has been at (or within a specific distance to) the geographic location of the digital object. The distance from the mobile device 122 to the geographic location of the digital object may be proportional to the familiarity score. The familiarity data may include other factors such as whether the mobile device 122 has accessed websites related to the current geographic location, sent or received emails related to the current geographic location, or includes contacts that live or have frequented the current geographic location. The familiarity score may be set according to a distance from a home location, which is set by the user or the configuration of the mobile device 122. The familiarity score may be calculated based on any combination of these examples. The familiarity data may be received at the mobile device 122 from the server 125 or vice versa.

Alternatively or in addition to defining user activity, the familiarity data may user be defined by a series of questions presented to the user on the mobile device 122. The series of questions may ascertain where the user lives, where the user works, how long the user has lived there, how long the user has worked there, or other historical data regarding the user.

The mobile device 122 or the server 125 is configured to define an event time period based on the familiarity data. The event time period may be inversely proportional to the familiarity score. The mobile device 122 or the server 125 is configured to associate the digital object with at least one additional digital object. The two digital objects are associated if they are collected or generated within the event time period of one another. Subsequent digital objects collected more than the event time period later than the additional digital object.

For example, the first digital object is collected by the mobile device 122 at the first time stamp and the second digital object is collected by the mobile device 122 at a second time stamp. The mobile device 122 or the server 125 is configured to calculate a difference between the second time stamp and first time stamp and compare the difference between the second time stamp and first time stamp to the event time period, which is based on the familiarity data. In response to the difference being less than the event time period, the mobile device 122 or the server 125 assigns the first digital object and the second digital object to a single event. In response to the difference exceeding the event time period, assigning the first digital object and the second digital object to different events.

FIG. 2 illustrates an example relationship between familiarity and an event definition or determination of the event time period. The familiarity score may be on any scale and the event time periods may be set to any values. Higher familiarity scores correspond to lower event time periods. Thus, in a linear example, each point of the familiarity score (FS) may corresponds to K minutes for the event time period (TP): TP=MAX hours−FS*K 6 minutes. In one example, the familiarity score is in the range from 0 to 100 and the event time period is set from 1 hour to 11 hours such that MAX=11 hours and K=6 minutes. This example is illustrated in FIG. 2.

Other formulas are possible. The relationship between the event time period and the familiarity score may be proportional, linear, inversely proportional, logarithmic, exponential or another relationship. The event time period may also be binary. That is, the event time period is either the default time period or the event time period is set to a very high level such as infinity. Therefore, when the familiarity score is above a threshold, the event time period is set to the default time period (e.g., 30 minutes, 1 hour, 4 hours, 6 hours, or another value). When the familiarity score is below the threshold, the event time period is set to the very high level, such as infinity. Other examples for the very high level include 24 hours, 99 hours, or 65536 minutes.

Figure 3A:
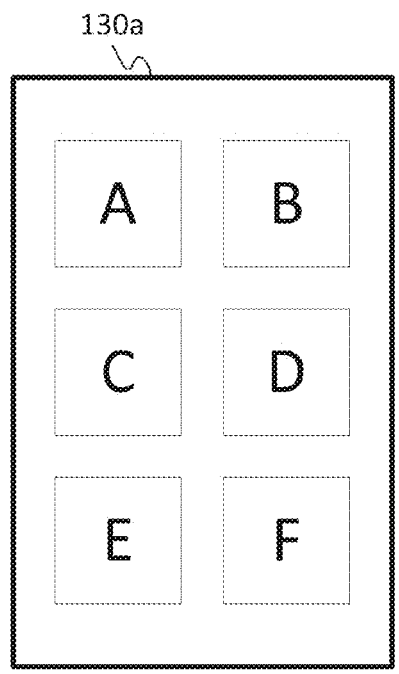
FIGS. 3A and 3B illustrate example digital object groups.
Figure 3B:
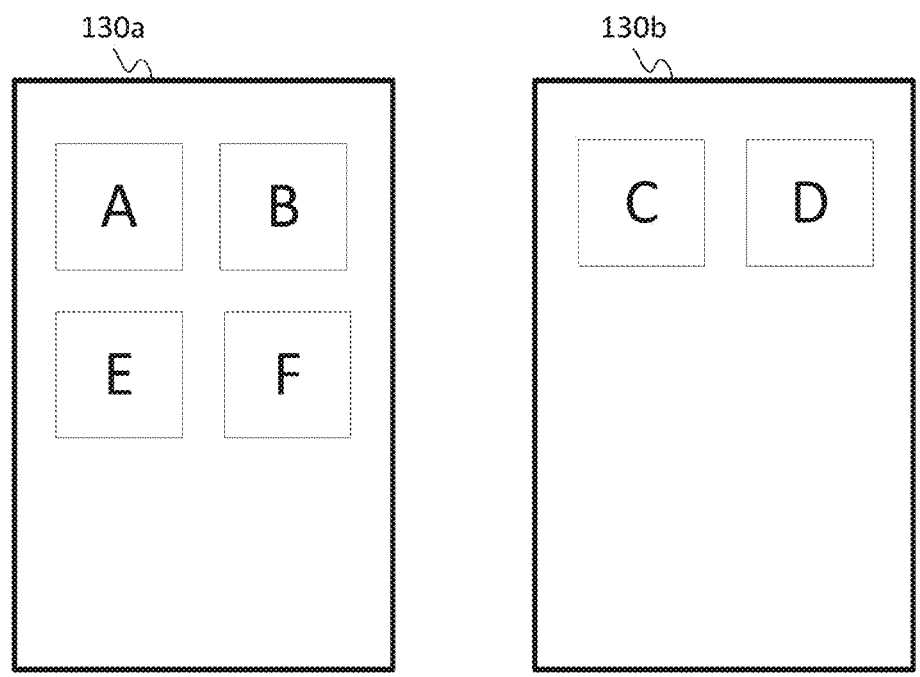

FIGS. 3A and 3B illustrate example object groups 130a and 130b. The organization, arrangement, or storage locations of the digital objects may change over time as the familiarity scores for the respective locations change over time. Object group 130a includes A-F. As a specific example for illustrative purposes, digital objects A-F were taken on a vacation traveling throughout the Western United States. Digital objects A and B are photographs taken in Wyoming. Digital objects C and D are photographs taken in Colorado. Digital objects E and F are photographs taken in Utah. Originally, the user is relatively unfamiliar with Wyoming, Colo., and Utah so all of the digital objects are grouped, organized, or stored together. That is the user's familiarity score for each of the locations in the metadata of the photographs is below the threshold. However, the user moves to Colorado. Over time, the user becomes more familiar with Colorado and the familiarity score for Colorado increases. The locations in the metadata of the photographs do not change. However, the familiarity scores tied to those locations do change. Eventually, the familiarity score pass the threshold and the mobile device 122 or the server 125 regroups the Colorado photographs (digital objects C and D) into a second group 130b. Thus, the event time period is set shorter as the familiarity data indicates the mobile device 122 or the user becomes more familiar with the geographic location, which causes a new event to be created for the Colorado photographs.

In one example, the server 125 or the mobile device 122 is also configured to compare the familiarity score to one or more naming thresholds to select location names for the digital objects. In one example with two levels of specificity, digital objects with familiarity scores above the naming threshold are assigned a specific location based name, and digital objects with familiarity scores below the naming threshold are assigned a general location based name. In addition, digital objects with familiarity scores above a grouping threshold are stored according to an organization strategy that defines short life events and digital objects with familiarity scores below the grouping threshold are stored according to an organization strategy that defines long life events.

The calculations for the familiarity score and the assignment of the names for the digital objects or the grouping of the digital objects may be performed on a per-user basis. Different users may have different familiarity scores for the same digital object and assigned different names or groupings for the same set of digital objects.

The digital objects may be organized in libraries according to familiarity scores without respect to the timestamps of the digital objects. The libraries may comprise folders that are defined according to individual users. The folders may have different levels of specificity based on the familiarity scores. For example, if an entire photo gallery on the mobile device 122 includes 10,000 photos, with 20 of those taken in France and the rest in the United States, the 20 from France may be grouped in a folder labeled "France," and the other 9,080 photos are broken down into more specific folders. It may not useful to name the "France" photos after the specific street names because the particular user of this mobile device 122 is not that familiar with France. Thus, the server 125 may calculate a low familiarity score for the France photos based on the makeup of the entire photo gallery. Conversely, 40% of the photos on the mobile device 122 were collected in a single neighborhood, the user is likely familiar with street names, and this more specific information is more likely to be known to the user ("Stevens Creek Blvd." instead of just "San Jose").

The same digital object may be assigned a different familiarity score, and accordingly, a different location based name, grouping or storage location, depending on the mobile device or user that is accessing the digital object. For example, a user takes a photograph at home, which is assigned a high familiarity score and the name "home" or "123 Main Street" and grouped with other digital objects collected within an hour. The user sends the photograph to another user in the same town. When the second user access the photograph, a medium familiarity score is assigned, and the name "New York" or "Queens" is used and the digital object is grouped with other digital object collected on the same day. The user sends the photograph to another user in another country, a low familiarity score is assigned and the name "New York" or "America" is used and the grouped with digital object collected across a span of several days. Likewise, the digital object may be accessed via website or social networking services by the three users, who each see a different location based name and photo album or storage location on the website or social networking service based on individual familiarity scores for the digital object.

The familiarity score may also be assigned to a group of users collectively. For instance, if a user posts a photo with location to a social network where the user's 20 friends or contacts can view the photo, the average familiarity with that location may be calculated to determine to assign an average familiarity score for the group. The location based name used for the group of people. Alternatively, the lowest familiarity may be used to ensure more recipients understand the name at the expense of specificity. In some instances, each member of a group should see the same name (e.g., within a family, social networking groups).

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors as a positioning system built or embedded into or within the interior of the mobile device 122. The mobile device 122 receives location data from the positioning system.

The optional workstation 128 is a general purpose computer including programming specialized for the following embodiments. For example, the workstation 128 may receive user inputs for defining the threshold level of the familiarity score. The workstation 128 may receive user inputs for modifying the levels of specificity applied to particular users. The workstation 128 includes at least a memory, a processor, and a communication interface.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In addition, the processing is divided substantially evenly between the server 125 and the mobile device 122 or workstation 128 ("hybrid embodiments").

Figure 4:
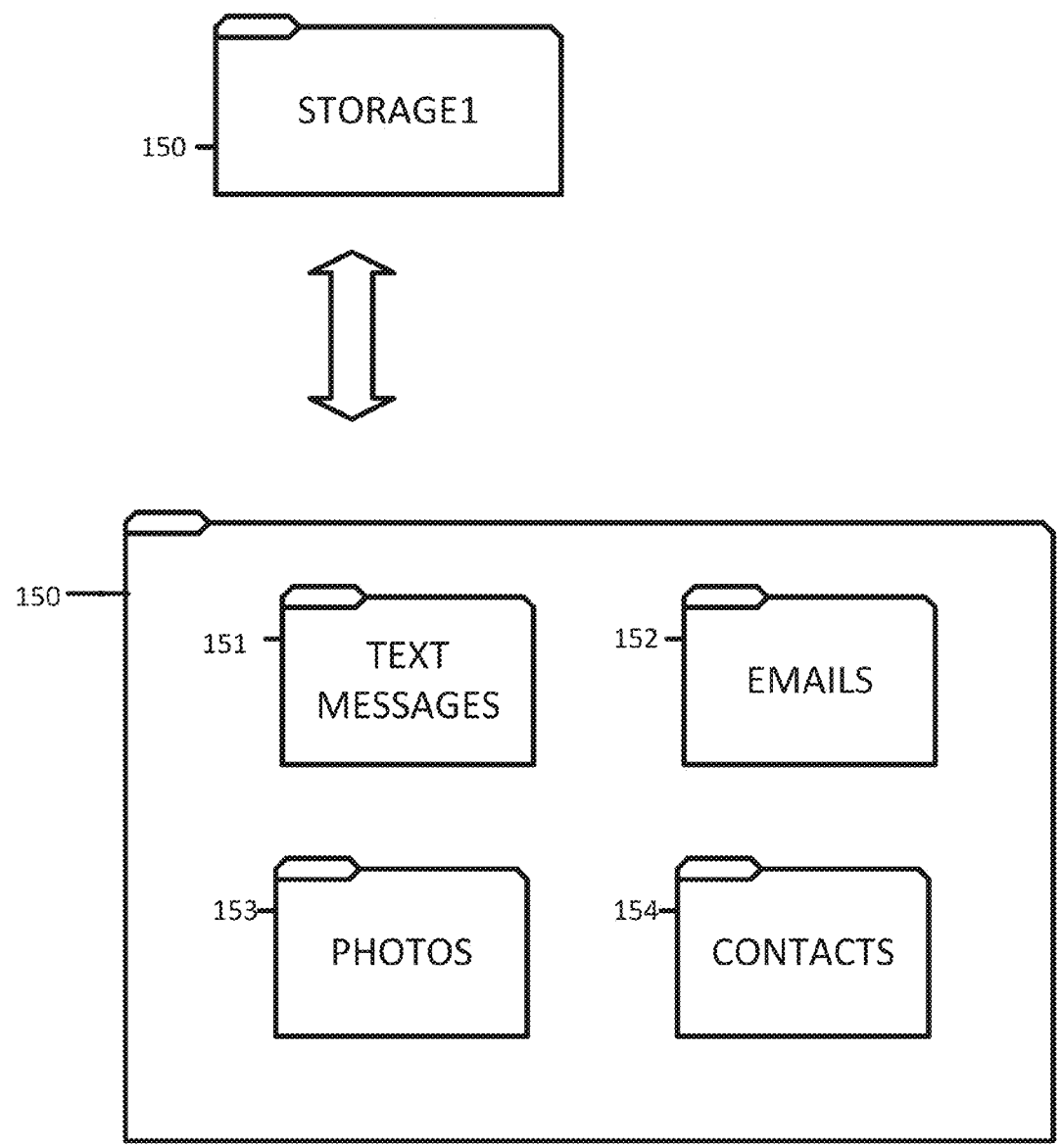
FIG. 4 illustrates another example organization of stored objects.

FIG. 4 illustrates an example organization of stored objects based on collection time and familiarity scores. The organization may represent the memory locations of the objects or an arrangement of display of the objects. Folder 150 is associated with a specific storage location. Within the folder are digital objects generated within a predetermined time period to one another. The digital objects may include text messages 151, emails 152, photos 153, and contacts 154. The selection of the digital objects included in the folder 150 is a function of the familiarity scores of the digital objects. The familiarity scores are a function of the geographic locations where the objects were created and the user activity near or related to those geographic locations. The name of the folder may be defined by the familiarity score for the geographic locations of the digital objects.

Figure 5:
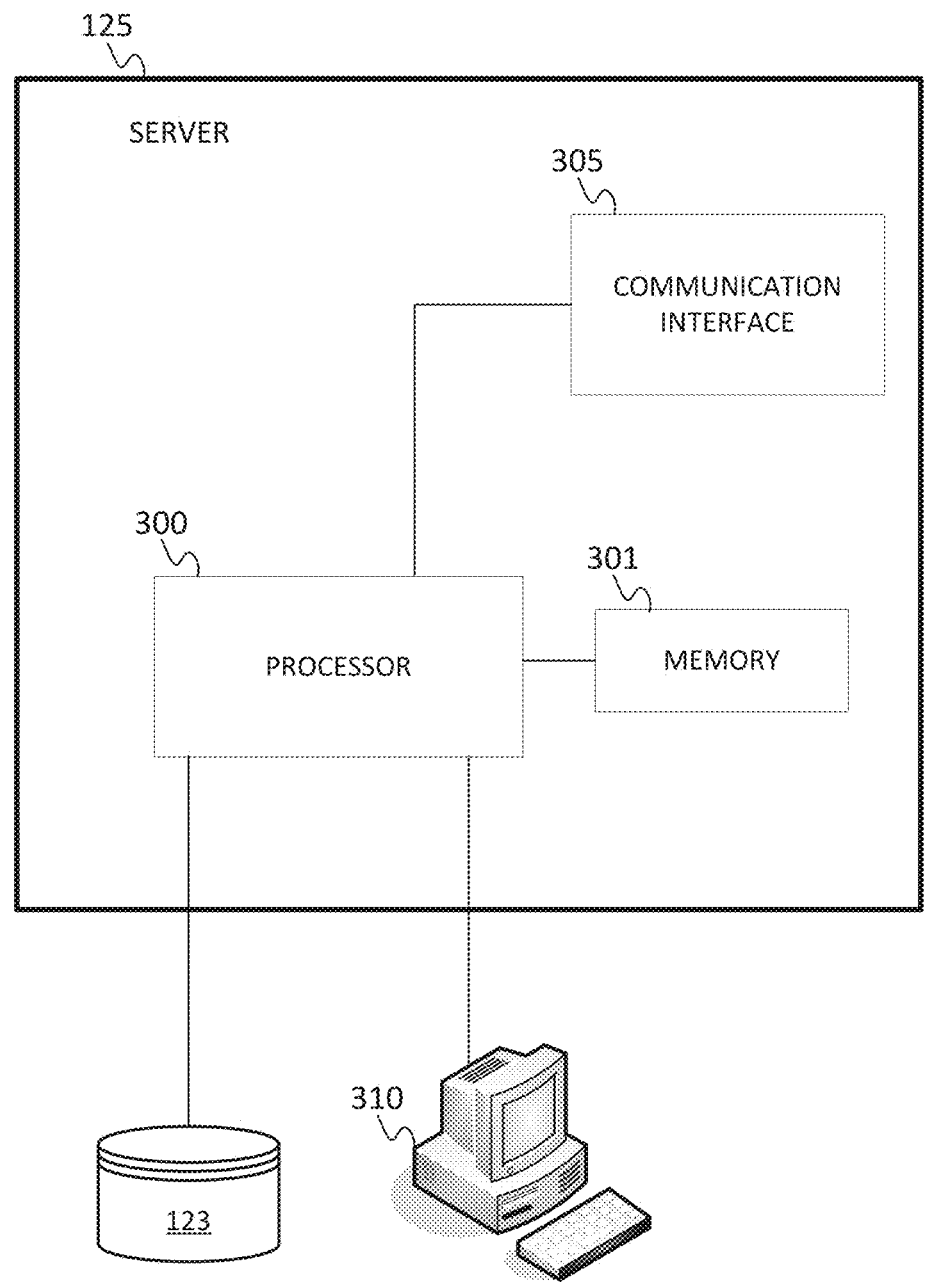
FIG. 5 illustrates an exemplary server of the system of FIG. 1.
Figure 6:
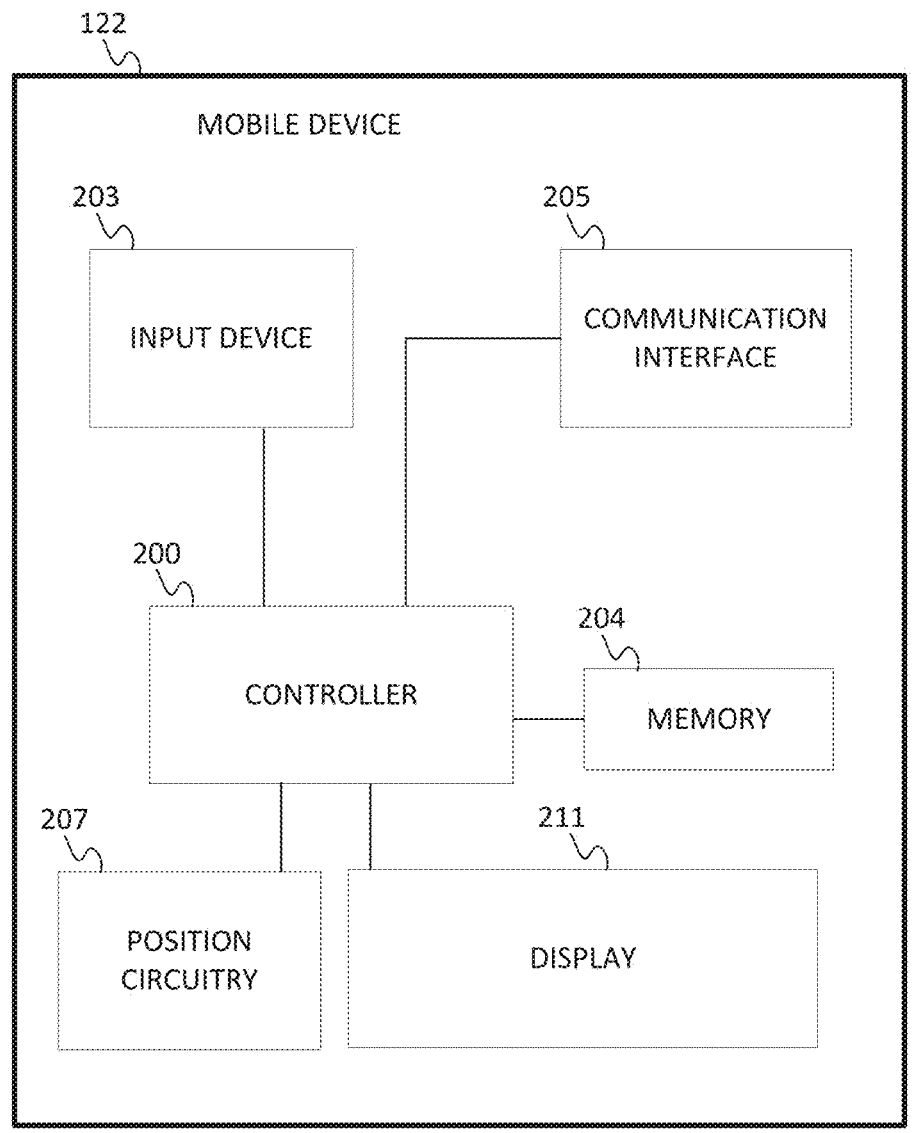
FIG. 6 illustrates an exemplary mobile device of the system of FIG. 1.

FIG. 5 illustrates an exemplary server of the system of FIG. 1. The server 125 is configured to assign specificity to location-based names. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122.

The server 125 receives a set of photographs from one or more mobile devices. The photographs may have been collected at the same, near the same time, or geographically spaced locations. The processor 300 is configured to assign a geographic location to each of the photographs. In addition, the processor 300 is configured to assign a timestamp to each of the plurality of photographs.

The memory 301 or database 123 is configured to store geographic location associated with familiarity scores. The geographic locations may be indexed based on longitude and longitude coordinates, town or city names, addresses, or by point of interest (POI) name. Each entry in the index is associated with a familiarity score. The familiarity scores are defined according to user activity.

The processor 300 is configured to access a familiarity score based on the geographic location for each of the photographs. The familiarity scores define an event time period. When successive photographs were collected within the event time period, the successive photographs are organized together. More specifically, the processor 300 is configured to access a time stamp from the metadata of each of the set of photographs. The processor 300 calculates a difference between the time stamp of each successive pair of photographs. If the difference is less than the event time period then the pair of photographs are stored in the same photo album. If the difference is greater than the event time period then a new album is created for the later photograph (i.e., the pair of photographs are stored in different photo albums).

The processor 300 is also configured to calculate familiarity scores. The processor 300 is configured to receive data indicative of past knowledge of a user of the mobile device 122 with the geographic location. In one example, the data is binary (e.g., yes or no) for whether the mobile device 122 has previously had any associations with the geographic locations. The data may be a familiarity score. The familiarity may be based on any combination of the data stored on the mobile device 122, past or current locations of the mobile device 122, content accessed by the mobile device 122, or social networking relationships associated with the mobile device 122.

The data stored on the mobile device 122 may be analyzed to calculate a familiarity score for the geographic location. For example, locations of photographs stored in the mobile device may be compared to the geographic location of the new data file, which may also be a photograph. If a predetermined number (e.g., 5, 10, or 20) or more of the stored photographs are within a distance range (e.g., 1 mile or 100 miles) to the new data file, then the mobile device 122 is familiar with the geographic location and a specific name is given to the data file. Alternatively, the mobile device 122 may perform a text search for the geographic location to determine whether the geographic location is a familiar location.

Recent or past locations of the mobile device 122 may be used to calculate the familiarity score. The location of the mobile device 122 may be logged. When a new data file is generated, the current location of the mobile device 122 is detected by position circuitry (e.g., global positioning system). Distances from the current location to past locations from the log are calculated. If a specific number (e.g., 1, 5, or 10) of distances are within a range (e.g., 10 miles, 100 miles) to current location, the data file is assigned a specific name. If fewer distances are near the current location, the data file is assigned a general name.

Content that has been accessed by the mobile device 122 may be used to calculate the familiarity score. For example, the mobile device 122 may be configured to filter data for geographic locations. When any locations are in the data, the mobile device 122 logs the locations as familiar locations. For example, the geographic database may include a list of location names. When a website is accessed that includes one of the location name, the location is logged as a familiar location. When the mobile device 122 is near the location and generates a data file, the data file is assigned a specific name.

The familiarity score may be based on contacts or friends associated with the mobile device 122. For example, each contact or friend may be associated with a home location. The home location may be entered into a social networking service. The home location may be detected by mobile devices of the contacts. The mobile device 122 may compare the current location to the home locations of the contact to determine whether the current location is a familiarly location. When the number of contacts within a predetermined range (e.g., 50 miles or 100 miles) exceeds a threshold (e.g., 1, 5, or 10 contacts), then the data file is assigned a specific name. Otherwise, the data file is assigned a general name.

The processor may also store a date, day of the week and/or time with the data file. For example, when a digital photograph is taken by the mobile device 122, at least data indicative of the current location of the mobile device 122 is sent to the processor 300.

Figure 7:
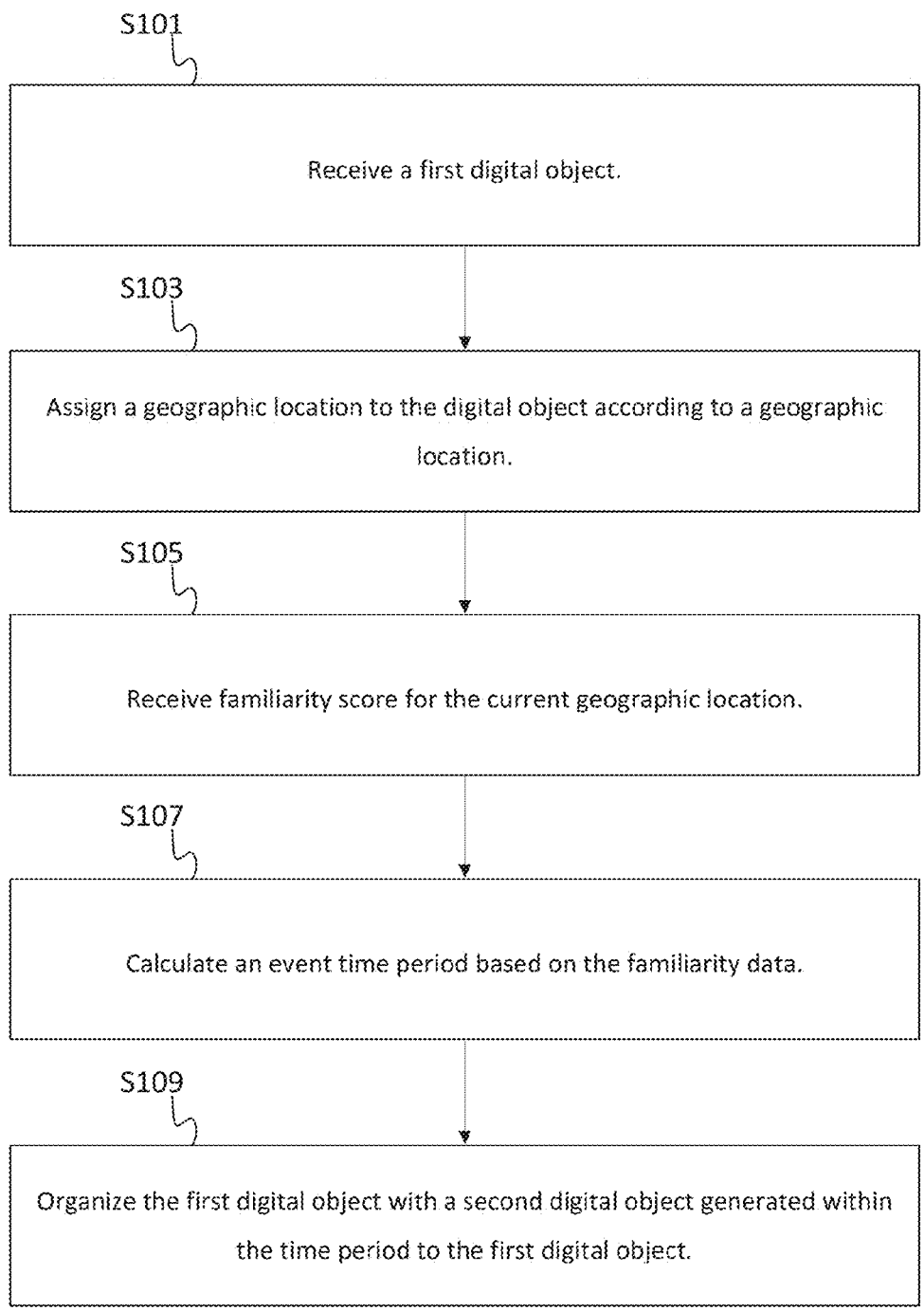
FIG. 7 illustrates another example flowchart for grouping digital objects based on familiarity.

FIG. 7 illustrates an exemplary mobile device of the system of FIG. 1. The mobile device 122 may be referred to as a navigation device. The mobile device 122 includes a controller 200, a memory 204, an input device 203, a communication interface 205, position circuitry 207, a camera 209, and a display 211. The workstation 128 may include at least a memory and processor and may be substituted for the mobile device in the following endpoint-based embodiments. In the following endpoint-based embodiments, the mobile device 122 or the workstation 128 performs a majority of the processing.

FIG. 11 illustrates another example flowchart for grouping digital objects based on familiarity, which is described in relation to the mobile device 122 but may be performed by another device. Additional, different, or fewer acts may be provided.

At act S101, the controller 200 receives a digital object. The digital object may be any file generated by mobile device 122. At the time the digital object is generated, the position circuitry 207 calculates the current geographic position of the mobile device 122. At act S103, the controller 200 assigns a geographic location to the digital object according to a geographic location.

At act S105, the controller 200 receives familiarity score for the current geographic location. The familiarity score may be received from the memory 204 or the database 123. The familiarity score may be received from the server 125 by the communication interface 205. The familiarity score may be received from a social networking service. The familiarity score may be stored in a lookup table including ranges of geographic coordinates or the familiarity score may be calculated according to a home location as a function of distance.

At act S107, the controller 200 is configured to calculate an event time period based on the familiarity data. The relationship between the event time period and the familiarity data may be stored in a lookup table by the memory 204. The relationship may be calculated according as a function of a familiarity score. The relationship between the event time period and the familiarity data may be inversely proportional. In one example, the event time period is turned off when the familiarity data indicates a familiarity below a threshold and the event time period is set to a default level when the familiarity data indicates a familiarity above the threshold. The threshold may be static, configured by the user, or set as a function of distance to a home location.

At act S109, the controller 200 is configured to organize the first digital object with a second digital object generated within the event time period to the first digital object. The organization may occur in the file structure of the memory 204 or the database 123. The organization may occur in an arrangement presented by the display 211. The organization may be photo albums presented in a slideshow, on a social networking service, or another website. When the first and second (or any number) of the digital objects were generated within the event time period, they are stored as a single event or a single photo album.

When successive digital objects are generated in time farther apart than the event time period, the digital objects are stored in different events or different photo albums. The familiarity data used for determining the event time period may be associated with the location where the first digital object is collected or the location where the second digital object was collected. In one example, the familiarity data for the first and second digital objects is average for determining the event time period.

The controller 200 is also configured to calculate an adjusted familiarity score over time according to user activity. For example, as a user experiences more activity near a specific location, the familiarity score for that location is increased. The controller 200 may decrease the event time period in response to the adjusted familiarity score.

The familiarity score may be a number from 1 to 100. The familiarity score may be a count of the number of digital objects associated with locations within a distance to the new geographic locations. For example, 20 digital photographs taken in Chicago and 5 contacts with Chicago area codes may result in a familiarity score of 25. The calculation may be weighted. For example, related contacts may increase the familiarity score twice as much as related photographs. Alternatively, the processor 300 of the server 125 performs any or all of acts S101-S109.

The user may specify the threshold levels that the familiarity scores are compared to using the input device 203. The user may specify whether the digital objects are organized or stored according to the familiarity measure mode, a normal mode, or a location only mode using the input device 203. The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   collecting a first digital object using a mobile device at a first time stamp;
   assigning a geographic location to the first digital object according to a current location of the mobile device;
   receiving familiarity score for the current geographic location, wherein the familiarity score is calculated based on a quantity of previously generated digital objects within a distance to the current geographic location;
   setting a time period based on the familiarity score;
   associating the first digital object with a second digital object generated within the time period to the first time stamp of the first digital object,
   calculating an adjusted familiarity score over time according to user activity;
   wherein the time period is set longer as the familiarity score indicates the mobile device is less familiar with the current geographic location of the mobile device; and
   decreasing the event time period in response to the adjusted familiarity score,
   wherein the associating for the first digital object and the second digital object is changed based on the adjusted familiarity score.

2. The method of claim 1, wherein the time period is set to a high level or infinite when the familiarity score indicates a low familiarity.

3. The method of claim 1, wherein the second digital object is collected by the mobile device at a second time stamp.

4. The method of claim 3, further comprising:
   calculating a difference between the at least one second time stamp and first time stamp;
   comparing the difference between the at least one second time stamp and first time stamp to the time period based on the familiarity score;
   assigning the first digital object and the second digital object to a single event if the difference is less than the time period; and
   assigning the first digital object and the second digital object to different events if the difference exceeds the time period.

5. The method of claim 1, wherein the digital object is a photograph, an audio recording, or a video recording.

6. The method of claim 1, wherein the event time period for the current geographic position is configured to change for the first digital object.

7. An apparatus comprising:
   at least one processor; and
   at least one memory including computer program code for one or more programs, the at least one memory and the computer program code configured to, with the at least one processor, cause the apparatus to perform at least the following, receive a first digital object;

assign a geographic location to the first digital object according to a geographic location;

receive a familiarity score for the current geographic location, wherein the familiarity score is calculated based on a quantity of previously generated digital objects within a distance to the geographic location;

calculate an event time period based on the familiarity score, wherein the event time period is set inversely proportional to the familiarity score;

determine an organization for the first digital object with a second digital object generated within the event time period to the first digital object;

calculate an adjusted familiarity score over time according to user activity; and decrease the event time period in response to the adjusted familiarity score, wherein the organization for the first digital object and the second digital object is changed based on the adjusted familiarity score.

8. The apparatus of claim 7, wherein the first digital object is a digital photograph.

9. The apparatus of claim 7, wherein the second digital object is an audio recording, a video recording, or a contact file.

10. The apparatus of claim 7, wherein the computer program code is configured to, with the at least one processor, cause the apparatus to perform, calculate a difference between a first time stamp for the first digital object and a second time stamp for the second digital object; and compare a difference between the second time stamp and first time stamp to the event time period based on the familiarity score.

11. The apparatus of claim 10, wherein the computer program code is configured to, with the at least one processor, cause the apparatus to perform, assign the first digital object and the second digital object to a single event when the difference is less than the event time period.

12. The apparatus of claim 10, wherein the computer program code is configured to, with the at least one processor, cause the apparatus to perform, assign the first digital object and the second digital object to different events if the difference exceeds the event time period.

13. The apparatus of claim 7, wherein the event time period is set longer as the familiarity score indicates a user is less familiar with the geographic location.

14. A non-transitory computer readable medium including instructions that when executed by a processor, instruct the processor to:

receive a plurality of photographs;

assign a geographic location to each of the plurality of photographs;

assign a time stamp to each of the plurality of photographs;

access a familiarity score based on the geographic location for each of the plurality of photographs, wherein the familiarity score is calculated based on a quantity of previously generated digital objects within a distance to the geographic location;

calculate an event time period based on the familiarity score;

determine an organization of the plurality of photographs according to familiarity scores and the event time period, calculate an adjusted familiarity score over time according to user activity, wherein the event time period is set longer as the adjusted familiarity score indicates a user is less familiar with the geographic location; and decrease the event time period in response to the adjusted familiarity score, wherein the organization for the plurality of photographs is changed based on the adjusted familiarity score.

15. The method of claim 1, wherein the time period is set inversely proportional to the familiarity score.

16. The non-transitory computer readable medium of claim 14, wherein the event time period is set inversely proportional to the familiarity score.

* * * * *